United States Patent [19]

Udagawa et al.

[11] Patent Number: 5,316,322
[45] Date of Patent: May 31, 1994

[54] METAL PLATE WITH INTERSECTING BEADS

[75] Inventors: Tsunekazu Udagawa, Ichikawa; Itsuo Ishikawa, Tokyo, both of Japan

[73] Assignee: Ishikawa Gasket Co., Ltd., Tokyo, Japan

[21] Appl. No.: 931,472

[22] Filed: Aug. 20, 1992

[30] Foreign Application Priority Data

Aug. 26, 1991 [JP] Japan ............... 3-075137[U]

[51] Int. Cl.⁵ .................................. F16J 15/08
[52] U.S. Cl. ....................... 277/235 B; 277/236
[58] Field of Search ........... 277/235 B, 236, 207 R, 277/207 A, 213

[56] References Cited

U.S. PATENT DOCUMENTS

| | | | |
|---|---|---|---|
| 4,203,608 | 5/1980 | Nicholson | 277/235 B |
| 4,810,591 | 3/1989 | Sakai . | |
| 4,861,047 | 8/1989 | Okano . | |
| 4,869,515 | 9/1989 | Uchida et al. . | |
| 4,975,933 | 12/1990 | Hampel | 378/5 |
| 5,170,027 | 12/1992 | Udagawa et al. | 277/235 B |

FOREIGN PATENT DOCUMENTS 3633988 4/1987 Fed. Rep. of Germany .
4-50762 4/1992 Japan .

*Primary Examiner*—William A. Cuchlinski, Jr.
*Assistant Examiner*—Daniel G. DePumpo
*Attorney, Agent, or Firm*—Kanesaka & Takeuchi

[57] ABSTRACT

A metal plate for a gasket is provided with a plurality of beads around portions to be sealed. The beads intersect together to form an intersecting portion, which has an outer edge to surround the intersecting portion, a center portion in the center thereof, and a surrounding portion situated between the center portion and the outer edge. A cutting portion penetrating through the plate is formed at the center portion. When the metal plate is tightened, the cutting portion operates to disperse stress applied to the center portion of the intersecting portion. Therefore, equal surface pressure is formed on the intersecting portion as well as the beads.

7 Claims, 2 Drawing Sheets

METAL PLATE WITH INTERSECTING BEADS

BACKGROUND OF THE INVENTION AND RELATED ART STATEMENT

The present invention relates to a metal plate having beads intersecting together, in particular a structure of a metal plate at a portion where the beads intersect.

An internal combustion engine is provided with a plurality of holes therein, such as cylinder bores, water holes, oil holes, bolt holes, push rod holes and so on. Some holes are securely sealed therearound to prevent leakage of fluid from the holes. For this purpose, the gasket is provided with specific sealing means around the holes to securely seal therearound.

In a metal laminate gasket formed of a plurality of metal plates, beads are often formed on the metal plate as sealing means around the holes to be sealed. When the gasket with the bead is tightened, the bead is compressed to form a surface pressure thereat to seal around the hole.

In a gasket, sometimes, holes to be sealed are located very close to each other. In this case, it is impossible to form a separate bead for each hole, but the adjacent beads are combined, and a common portion of the beads is eliminated. As a result, the two beads are intersected together.

When the two beads intersect, the intersecting portion of the two beads becomes eventually large. Therefore, when a plate with the intersecting portion of the two beads is compressed, the intersecting portion can not provide surface pressure equal to that formed on the rest of the beads. The surface pressure at the intersecting portion is generally weaker than that at the rest of the beads.

Also, since the intersecting portion is large, when the bead is compressed, equal tightening pressure may not be applied to the entire intersecting portion, i.e. eccentric stress may be locally formed on the intersecting portion. Accordingly, the surface pressure on the intersecting portion may be partly different, so that leakage may occur through a weak surface pressure portion in the intersecting portion.

In U.S. Pat. No. 4,861,047, a depression is formed at a middle of an intersecting portion of the beads to extend downwardly therefrom. The depression at the intersecting portion provides stiffness at that portion, so that the intersecting portion can provide surface pressure substantially equal to that at the rest of the beads.

In U.S. Pat. No. 4,869,515, a depression is formed at an intersecting portion of two beads. The depression extends from one edge portion of the bead to reduce the area of the intersecting portion.

In Japanese Utility Model Publication No. 4-50762 published on Apr. 28, 1992, an intersecting portion of two beads is formed to have a large area, so that a high pressure portion is formed at a part of the intersecting portion.

The above mechanisms operate as intended. However, when the intersecting portion of the beads is compressed, local eccentric stress may be formed at the intersecting portion to cause leakage of fluid.

Therefore, one object of the invention is to provide a metal plate with an intersecting portion of the beads, wherein the beads can substantially provide equal surface pressure throughout the entire area of the beads including the intersecting portion thereof when compressed.

Another object of the invention is to provide a metal plate as stated above, wherein local eccentric stress is not substantially formed at the intersecting portion of the beads when compressed.

A further object of the invention is to provide a metal plate as stated above, which can be formed easily and economically.

Further objects and advantages of the invention will be apparent from the following description of the invention.

SUMMARY OF THE INVENTION

A metal plate for a gasket of the invention is formed of a main metal plate, which includes a plurality of beads formed around portions to be sealed. The beads intersect to each other to form at lease one intersecting portion on the metal plate.

The intersecting portion includes an outer edge to surround the intersecting portion, a center portion situated in the center of the intersecting portion, and a surrounding portion located between the outer edge and the center portion.

A cutting portion penetrating through the main metal plate is formed in the center portion of the intersecting portion. Therefore, when the metal plate is tightened, the center portion is at first compressed to allow the stress applied to the center portion to uniformly disperse over the entire intersecting portion. The surface pressure at the surrounding portion is substantially the same as that on the beads outside the intersecting portion.

In the present invention, further, since the cutting portion is formed in the center portion, the intersecting portion can be compressed easily. Therefore, the present invention is useful for a gasket to which relatively lower tightening pressure is applied.

In the present invention, preferably, the cutting portion is a hole formed in the center of the intersecting portion. The distance from an inner edge of the hole to the nearest outer edge of the intersecting portion is substantially the same throughout the intersecting portion.

The outer edge of the intersecting portion may at least partly extend outwardly to form the intersecting portion greater than the width of the bead. Preferably, the distance between the inner edge and the outer edge in the intersecting portion is substantially the same as the width of the bead.

The center portion with the cutting portion is located in a horizontal level (cross sectional height) as in the surrounding portion. However, the center portion may be depressed so that a projection similar to the beads is formed at the surrounding portion.

DETAILED DESCRIPTION OF PREFERRED EMBODIMENTS

Figure 1:
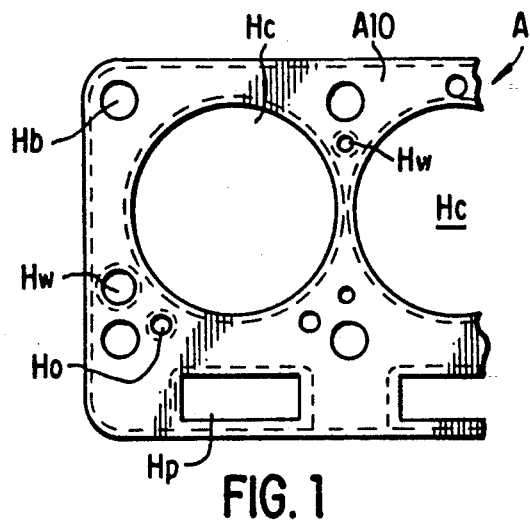
FIG. 1 is a partial plan view of a first embodiment of a metal plate for a gasket of the invention.
Figure 2:
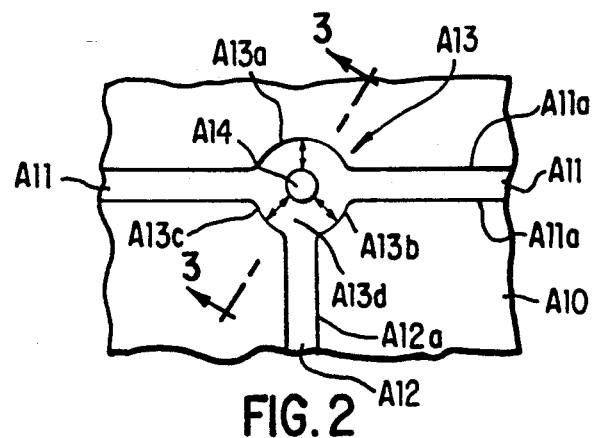
FIG. 2 is an enlarged plan view of an intersecting portion of two beads shown in FIG. 1.
Figure 3:
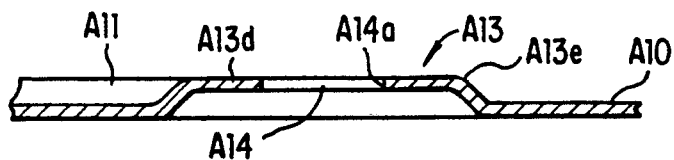
FIG. 3 is an enlarged section view taken along a line 3—3 in FIG. 2.

Referring to FIGS. 1-3, a first embodiment A of a metal plate A10 for a gasket of the invention is shown. The metal plate A10 is a cylinder head gasket and is provided with a plurality of cylinder bores Hc, water holes Hw, oil holes Ho, bolt holes Hb, push rod holes Hp, and so on, as in the conventional gasket.

Beads are formed around the edges of the metal plate A10 as well as around the cylinder bores Hc, the water holes Hw, the oil holes and the push rod holes Hp, which are shown in dot lines in FIG. 1. The beads around the edges of the metal plate A10 and the push rod holes Hp are combined and interconnected together.

As clearly shown in FIG. 2, beads A11, A12 intersect in a T-shape to form an intersecting portion A13. The bead A11 has side edges A11a, and the bead A12 has side edges A12a. The intersecting portion A13 is defined by curved portions A13a, A13b, A13c, which are connected to the side edges A11a, A12a.

The intersecting portion A13 surrounded by the curved portions A13a, A13b, A13c has a flat top portion A13d and a hole A14 with an inner edge A14a in the center thereof. The distances from the inner edge A14a to the respective curved portions A13a, A13b, A13c are the same. Namely, the hole A14 is located in the center of the intersecting portion A13.

Also, the distance from the inner edge A14a to the respective curved portion A13a, A13b, A13c is substantially the same as the widths of the beads A11, A12. The height of the intersecting portion A13 is the same as the height of the beads A11, A12.

When the plate A10 with the beads A11, A12 is situated between a cylinder head X and a cylinder block Y (both not shown) and is tightened therebetween, the intersecting portion A13 as well as the beads A11, A12 are compressed. As the beads A11, A12 and the intersection portion A13 are further compressed, the edge A14a is pushed downwardly.

As the plate A10 is further compressed, the edge A14a abuts against the cylinder block Y, whereby a part A13e of the flat portion A13d, i.e. inside the respective curved portions A13a, A13b, A13c, abuts against the cylinder head X. Then, the part A13e is compressed between the cylinder head X. and the cylinder block Y. Namely, a surface pressure is formed at the part A13e, which is substantially equal to that formed on the beads A11, A12. Accordingly, the intersecting portion A13 can provide substantially equal surface pressure throughout the beads A11, A12.

Since the surface pressures on the beads A11, A12 are substantially equal to that on the intersecting portion A13, leakage at the intersecting portion A13 is securely prevented.

In the present invention, the hole A14 is formed in the center of the intersecting portion A13. Therefore, when the intersecting portion A13 is at first compressed, compressing force applied onto the intersecting portion A13 is not concentrated at one portion. Stress formed at the intersecting portion A13 when the intersecting portion A13 is compressed is smoothly dispersed over the entire intersecting portion A13 by the hole A14.

In this respect, if there is no hole in the intersecting portion A13, the surface pressure on the intersection portion A13 may be different in portions due to different stress applied onto the intersecting portion A13. As a result, the surface pressure on the intersecting portion is not equal over the entire intersecting portion, so that leakage may occur.

In the present invention, the hole A14 can relieve stress formed on the intersecting portion A13. Therefore, equal surface pressure is formed throughout the entire beads A11, A12 and the intersecting portion A13.

Figure 4:
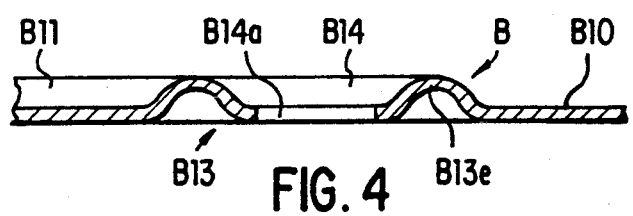
FIGS. 4 and 5 are section views, similar to FIG. 3, for showing second and third embodiments of the invention.

FIG. 4 shows a second embodiment B of the metal plate of the invention. The metal plate B10 includes beads B11, B12 and an intersecting portion B13, as in the gasket A. However, in the gasket B, the intersecting portion B13 does not have a flat surface, and instead, an edge B14a is bent to be located on the same horizontal level as that of the plate B10. Accordingly, a portion B13e located inside curved portions B13a, B13b, B13c of the intersecting portion B13 projects outwardly to form a circular bead in the intersecting portion B13.

In the gasket B, the intersecting portion B13 has the portion B13e like the bead, which communicates with the bead B11, B12. Therefore, when the gasket B is tightened, the portion B13e and the beads B11, B12 are equally compressed to provide the same surface pressure throughout the beads. The gasket B operates as in the gasket A.

Figure 5:
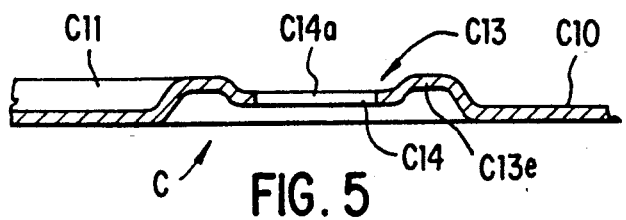

FIG. 5 shows a third embodiment C of the metal plate of the invention. The metal plate C10 includes beads C11, C12 and an intersecting portion C13, as in the gaskets A and B. However, the intersecting portion C13 does not have a flat surface, and instead, an edge C14a is bent to be located on a horizontal level slightly above the plate C10. Accordingly, a portion C13e located inside curved portions C13a, C13b, C13c of the intersecting portion C13 projects slightly outwardly to form a projection in the intersecting portion C13.

In the gasket C, the intersecting portion C13 has the portion C13e projected outwardly. When the gasket C is tightened, the beads C11, C12 and the portion C13e are compressed to provide substantially the same surface pressure throughout the beads. The gasket C operates as in the gaskets A and B.

Figure 6:
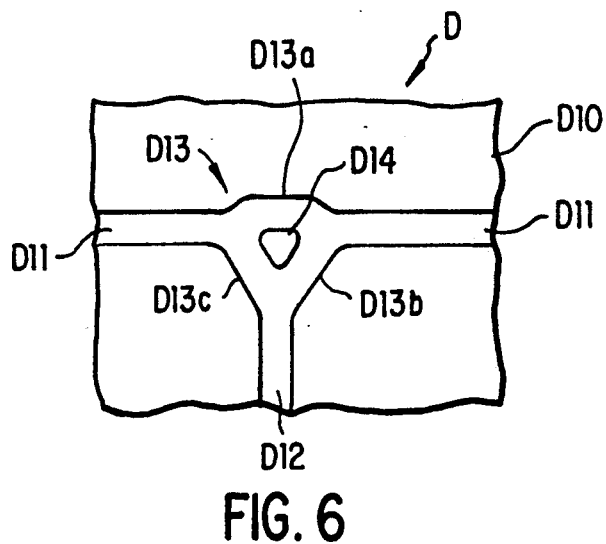
FIGS. 6-8 are enlarged plan views of intersecting portions, similar to FIG. 2, for showing fourth to sixth embodiments of the invention.

FIG. 6 shows a fourth embodiment D of a metal plate of the invention. The plate D10 includes beads D11, D12, an intersecting portion D13 and a hole D14, as in the gasket A. However, in the gasket D, the intersecting portion D13 has a triangular shape, not round as in the gasket A. Namely, parts of outer edges D13a, D13b, D13c have straight portions, and the hole D14 has a triangular shape as in the intersecting portion D13. The rest of the structure and the operation of the gasket D are the same as those of the gasket A.

Figure 7:
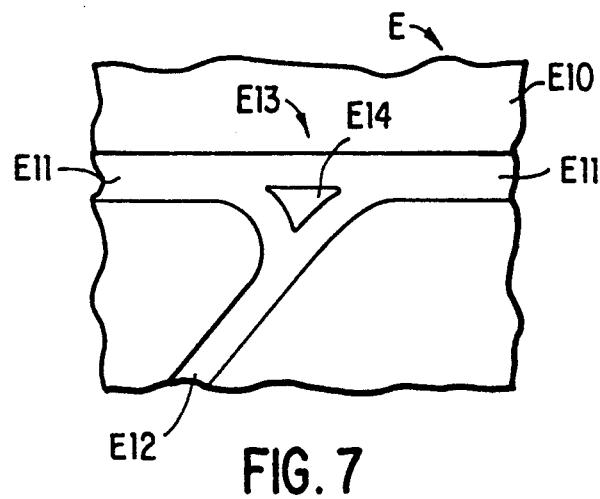

FIG. 7 shows a fifth embodiment E of a metal plate of the invention. The plate E10 includes beads E11, E12, an intersecting portion E13 and a hole E14, as in the gasket A. However, in the gasket E, the bead E12 intersects the bead E11 obliquely. The intersecting portion E13 has a triangular shape, and accordingly, the hole E14 is formed to have a triangular shape as in the intersecting portion E13. The rest of the structure and the operation of the gasket E are the same as those of the gasket A.

Figure 8:
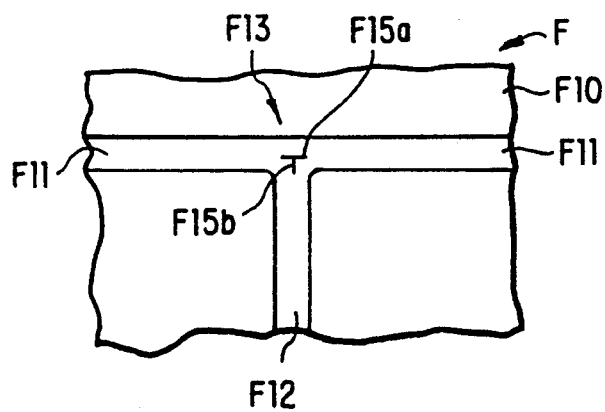

FIG. 8 shows a sixth embodiment F of a metal plate of the invention. The plate F10 includes beads F11, F12 and an intersecting portion F13, as in the gasket A. In the gasket F, no hole is provided in the intersection portion F13, and instead, slits F15a, F15b parallel to the beads F11, F12, respectively, are formed. When the gasket F is tightened, eccentric stress applied to the intersecting portion F13 is dispersed by the slits F15a, F15b. The slits F15a, F15b are formed at a portion where vibration is not substantially transmitted.

In the gasket of the invention, a cutting portion, i.e. hole or slit, is formed in the intersecting portion of the beads. Therefore, the stress formed at the intersecting portion when the gasket is tightened is dispersed equally at the intersecting portion. Equal surface pressure is formed at the intersecting portion as well as the beads.

While the invention has been explained with reference to the specific embodiments of the invention, explanation is illustrative and the invention is limited only by the appended claims.

What is claimed is:

1. A metal plate for a gasket, comprising, a main metal plate having an outer surface, and a plurality of beads formed on the main metal plate around portions to be sealed to project outwardly from the outer surface of the main plate, sad beads intersect with each other and having at least one intersecting portion, said intersecting portion having an outer edge to surround the intersecting portion, a center portion situated in a center of the intersecting portion, a surrounding portion located between the outer edge and the center portion, said surrounding portion having a cross sectional height which is the same as a cross sectional height of said beads, and a hole with an inner edge, said hole penetrating through the main metal plate and located in the center portion of the intersecting portion so that when the metal plate with the intersecting portion is tightened, the inner edge is at first compressed and the hole operates to disperse stress applied to the inner edge, a nearest distance between the inner edge and the outer edge being substantially the same throughout the intersecting portion to thereby form a surface pressure at the surrounding portion substantially the same throughout the intersecting portion and as that on the bead outside the intersecting portion.

2. A metal plate according to claim 1, wherein said beads have edges to define the beads therebetween, at least a part of the outer edge of the intersecting portion extending outwardly beyond the edge of the bead to thereby provide the intersecting portion greater in lateral size than the width of the bead.

3. A metal plate according to claim 2, wherein said hole has a size so that the distance between the inner edge and the outer edge is substantially the same as the width of the bead.

4. A metal plate according to claim 2, wherein a cross sectional height of the center portion is the same as said cross sectional height of the surrounding portion.

5. A metal plate according to claim 2, wherein a cross sectional height of the center portion is less than said cross sectional height of the surrounding portion.

6. A metal plate according to claim 5, wherein said cross sectional height of the center portion is the same as a cross sectional height of the main metal plate.

7. A metal plate according to claim 2, wherein cross sectional height of the center portion with the hole is located between horizontal levels of the surrounding portion and the main metal plate.

* * * * *

UNITED STATES PATENT AND TRADEMARK OFFICE
CERTIFICATE OF CORRECTION

PATENT NO.  : 5,316,322
DATED       : May 31, 1994
INVENTOR(S) : Tsunekazu Udagawa et al It is certified that error appears in the above-identified patent and that said Letters Patent is hereby corrected as shown below:

Column 5,

Claim 1, line 5, change "sad" to --said--; and
        line 6, change "intersect" to --intersecting--.

Signed and Sealed this

Sixteenth Day of August, 1994

Attest:

BRUCE LEHMAN

Attesting Officer                Commissioner of Patents and Trademarks